(12) United States Patent
Schadwinkel et al.

(10) Patent No.: US 7,655,888 B2
(45) Date of Patent: Feb. 2, 2010

(54) LASER SCANNING MICROSCOPE AND ASSEMBLY FOR NON-DESCANNED DETECTION

(75) Inventors: Harald Schadwinkel, Hannover (DE); Hubert Wahl, Stadtroda (DE); Dieter Schau, Lehesten (DE)

(73) Assignee: Carl Zeiss Microimaging GmbH, Jena (DE)

( * ) Notice: Subject to any disclaimer, the term of this patent is extended or adjusted under 35 U.S.C. 154(b) by 0 days.

(21) Appl. No.: 12/362,110

(22) Filed: Jan. 29, 2009

(65) Prior Publication Data

US 2009/0194715 A1    Aug. 6, 2009

(30) Foreign Application Priority Data

Jan. 31, 2008    (DE) .................. 10 2008 007 452

(51) Int. Cl.
*G02B 7/04* (2006.01)
(52) U.S. Cl. .................................... 250/201.3; 250/239
(58) Field of Classification Search .............. 250/201.3, 250/234, 235, 559.4, 239, 458.1, 459.1, 461.1; 359/389, 363, 368, 385; 356/326, 318, 346
See application file for complete search history.

(56) References Cited

U.S. PATENT DOCUMENTS 6,094,299 A    7/2000  Schau et al.
6,437,913 B1   8/2002  Kishi
6,947,127 B2 * 9/2005  Wolleschensky et al. ...... 356/73
2002/0159144 A1 10/2002 Engelhardt et al.

FOREIGN PATENT DOCUMENTS

| DE | 197 02 753 | 7/1998 |
|---|---|---|
| DE | 192 22 870 | 11/1999 |
| DE | 101 20 424 | 11/2002 |

* cited by examiner

*Primary Examiner*—Que T Le
(74) *Attorney, Agent, or Firm*—Reed Smith LLP

(57) ABSTRACT

A scanning microscope with a light source which emits illumination light for illuminating a specimen, with at least a first detector for detecting the detection light proceeding from the specimen, and with an objective through which the specimen can be illuminated and detected, wherein the objective is arranged in an illumination beam path and in a detection beam path, and with a second detector for non-descanned detection of the detection light proceeding from the specimen, wherein a compact assembly is provided which comprises a housing which is attached to a microscope stand and which has at least one receptacle for a microscope objective for the illumination beam path and/or detection beam path of the scanning microscope, wherein at least the second detector is arranged in the housing and can be acted upon by specimen light.

21 Claims, 4 Drawing Sheets

LASER SCANNING MICROSCOPE AND ASSEMBLY FOR NON-DESCANNED DETECTION

The present application claims priority from German Patent Application No. DE 10 2008 007 452.7, filed on Jan. 31, 2008, the disclosure of which is incorporated herein by reference in its entirety.

BACKGROUND OF THE INVENTION

1. Field of the Invention

The invention is directed to a laser scanning microscope with at least one light source emitting illumination light for illuminating a specimen, at least a first detector for detecting the detection light proceeding from the specimen, and an objective through which the specimen can be illuminated and detected, the objective being arranged in an illumination beam path and in a detection beam path, and with an additional non-descanned detection beam path, particularly for detecting detection light originating from nonlinear excitation by means of pulsed laser light.

2. Description of Related Art

A microscope of the type mentioned above is described, for example, in DE 19702753 and is shown by way of example in FIG. 1 as prior art.

Non-descanned detectors are provided in an out-coupling between the objective and tube lens and on the side of the specimen located opposite the objective for transmission.

Non-descanned detection (NDD) has established itself as a standard method for nonlinear laser scanning microscopy. In this detection mode, the light emitted from the specimen is detected integrally by means of a large-area sensor rather than by the scanning optics or through a pinhole. Focusing optics can be provided in front of the detector.

A small specimen volume can be excited and imaged through the nonlinear processes during excitation also without confocal detection. Further, this integral detection mode uses a relatively large portion of the light emitted by the specimen.

The detection efficiency can be further increased when the NDD is situated as near to the microscope objective as possible. This was achieved by means of a lateral out-coupling in the vicinity of the objective exit pupil.

Arrangements of this type are also described in U.S. Pat. No. 6,437,913 B1 and DE 101 20 424 B4.

Since NDDs are used primarily in electrophysiological applications and in apparatus with objective turret focusing, the known type of out-coupling is difficult. One reason for this is that the out-coupling unit and the NDD assembly must be moved along with focusing; another reason is that the detectors which protrude at the sides limit the accessibility to specimens that is required for electrophysiological applications (manipulation, patch clamp). This additional weight load, which is also asymmetrical primarily because of the lateral out-coupling, dramatically reduces the positioning accuracy and the traveling speed of the focusing unit. An added difficulty arises in that it is also becoming increasingly important for applications using biological specimens that a plurality of wavelength regions be detected independently from one another. As a result of this, two or more NDD units are cascaded, which increases the moved mass twofold or more and this mass acts by way of a lever arm that increases in size in proportion to the cascading.

SUMMARY OF THE INVENTION

The object of the invention is to overcome the disadvantages mentioned above.

The above-mentioned disadvantages of a lateral out-coupling can be prevented in an advantageous manner according to the invention in that the detector is integrated directly in the objective carrier or objective changer. For this purpose, the out-coupling and the detector are advantageously disposed between the objective and the guide required for the focusing of the objective changer. Therefore, the loading of the guide is no longer laterally asymmetrical and the accessibility of the specimen space is not limited toward the front and the sides.

The invention is the subject matter of the independent patent claims.

Advantageous developments are indicated in the dependent claims.

DETAILED DESCRIPTION OF EMBODIMENTS

Figure 1:
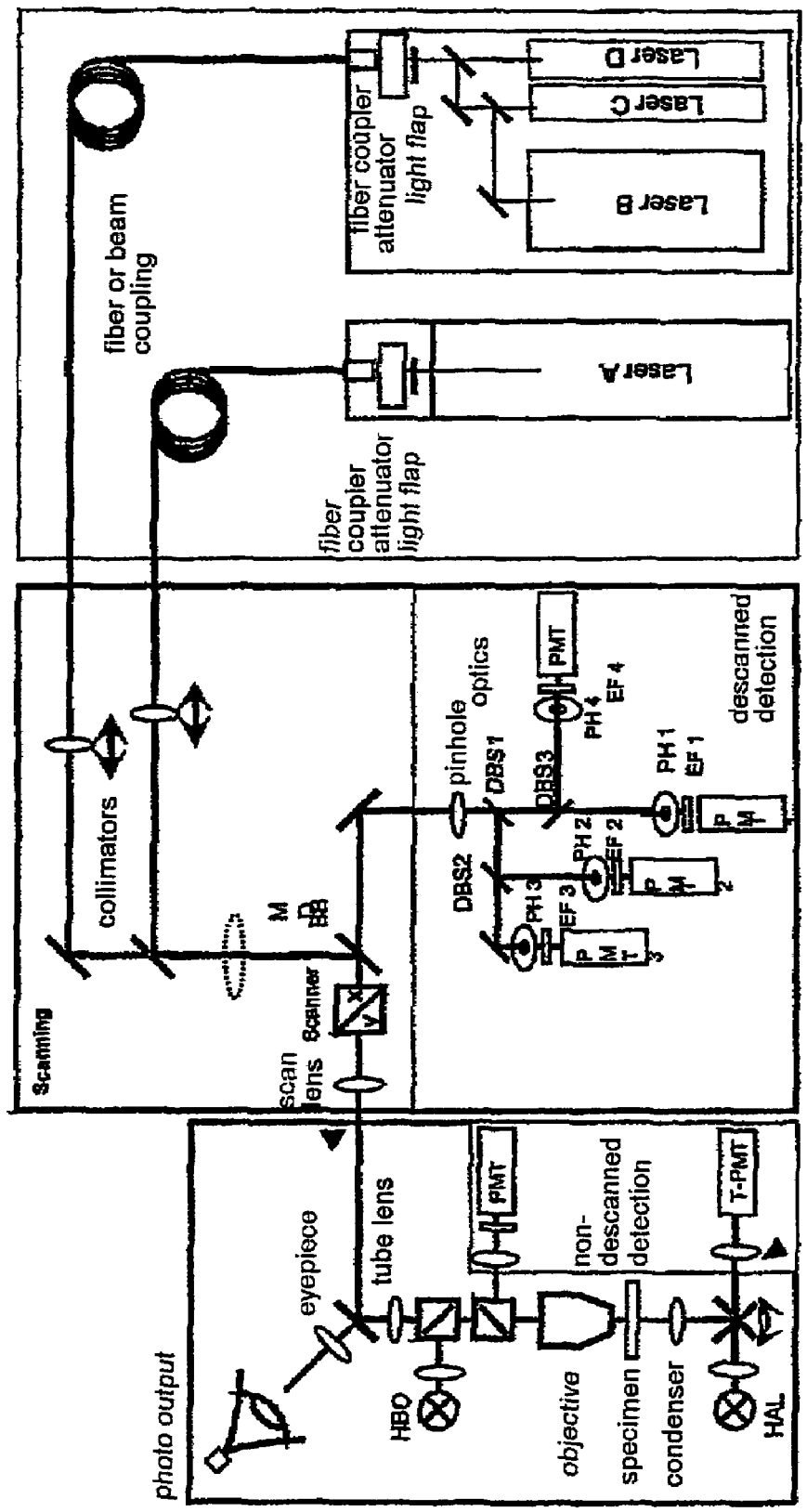
FIG. 1 shows an assembly according to one embodiment of the current invention.

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

The integration, according to the invention, of an NDD in the carrier for the objective changer on a microscope is shown in the drawings. This embodiment example shows an upright microscope with objective focusing; however, the invention could also be applied to other types of microscope (inverted microscopes) in an analogous manner.

The light coming from the specimen is collected through an objective and imaged on a detector by beam deflectors and possibly through additional imaging optics. In practice, it is common to change between descanned detection and non-descanned detection. This can be carried out by means of a corresponding reflecting or partially transmitting element which switches the beam path or splits the beam path for both.

All of the drawings show a dovetail guide 1 which serves in an advantageous manner for articulation at a microscope stand (not shown) so as to be adjustable in height and fixable by means of a locking knob.

It is known in general from the prior art to adjust the stage in vertical direction or to adjust the objective in vertical direction, or both, in order to focus. U.S. Pat. No. 5,270,855 (disclosure of prior art) is mentioned in this connection by way of example.

Accordingly, the assembly according to the invention can also be vertically adjusted jointly with the objective in the invention so that the optical relationship, particularly the optical path length between the objective and detector, is advantageously maintained.

Figure 2:
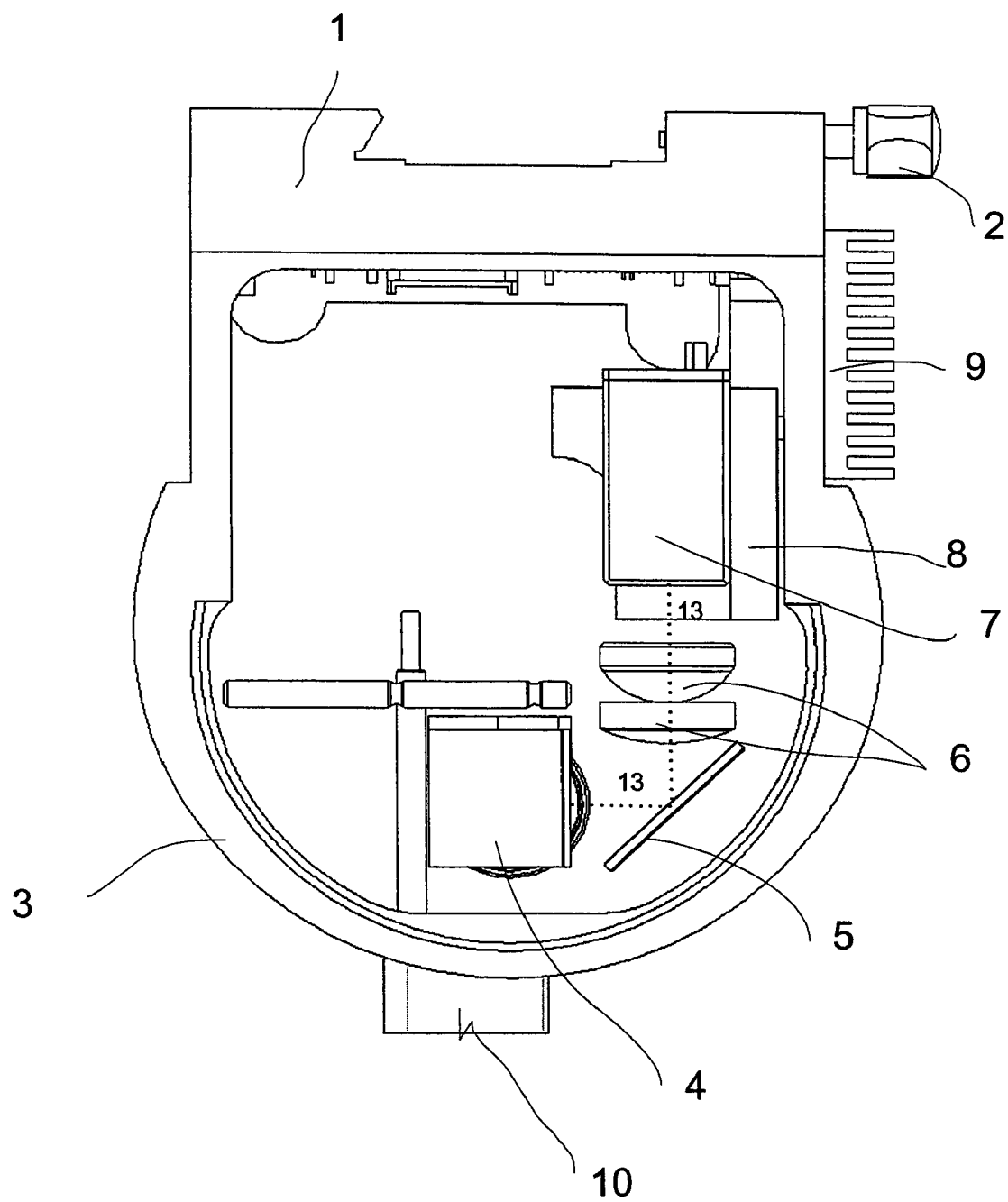
FIG. 2 shows a top view of the assembly.

A mirror 4 which is swivelable by means of an operator's control and a turn rod 10 is provided in a housing 3 and is arranged above an optical aperture with an objective thread 11 and a microscope objective, not shown. The beam path 13 which runs along the swiveling mirror 4 is shown in dashed lines in FIGS. 1 and 2. By way of the swiveling mirror 54 and an additional deflecting mirror 5 and focusing optics 7, the light passing through the microscope objective reaches a detector 7, advantageously a PMT, which is arranged inside the housing 3. The detector can be designed so as to be exchangeable by means of suitable plug-in boards.

When the mirror 4 is swiveled out of the beam path, the specimen light travels in direction of the descanned detection arrangement of the microscope as is described in the prior art cited above.

In addition to the detector 7, there is also a heat-conducting transmission piece 8 for conducting heat away from the detector toward the outside of the housing 3.

Figure 3:
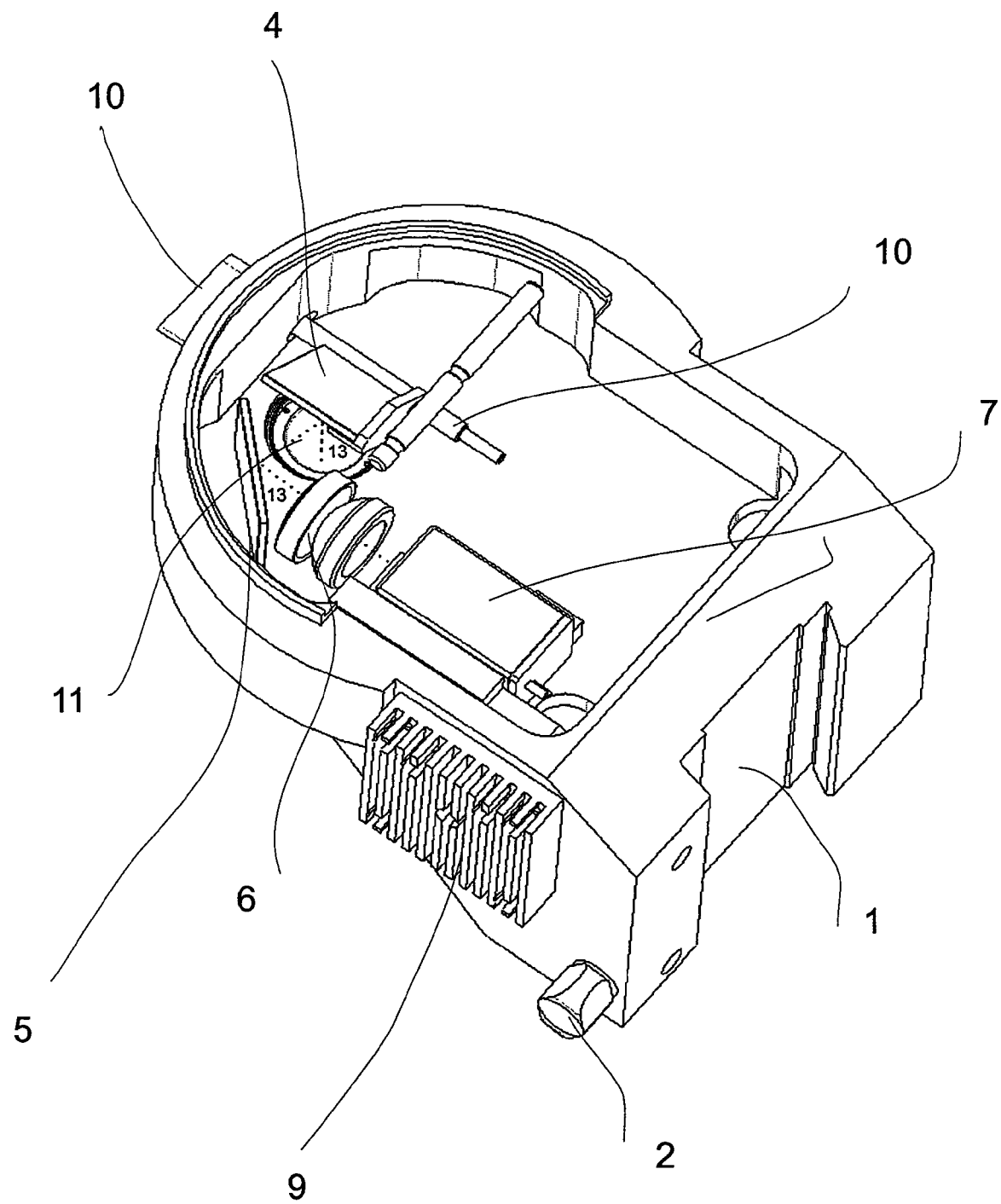
FIG. 3 shows a first oblique view.
Figure 4:
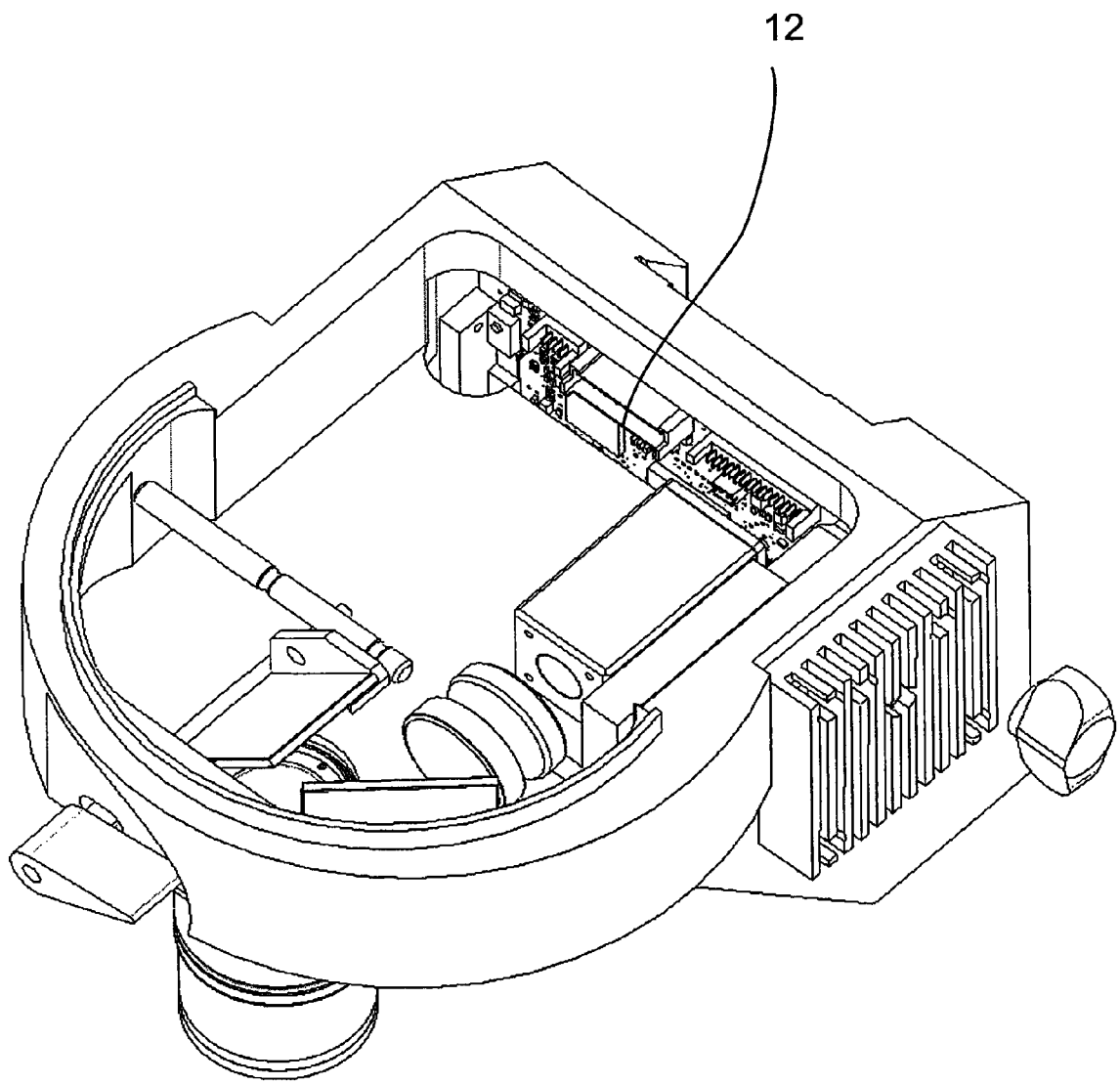
FIG. 4 shows a second oblique view which is offset by 90 degrees with respect to FIG. 2.

FIG. 3 also shows that the receiver electronics 12 for the receiver 7 are advantageously also arranged in the housing 3 of the assembly. They are connected (not shown) to the central control unit of the microscope. The focusing of the microscope is also carried out in a known manner by this central control unit, usually by an electrically-powered displacement of the microscope objective along the optical axis by means of a unit which is vertically displaceable at the microscope objective and to which the described assembly is fitted or attached (i.e., via the dovetail 1 guide). Accordingly, a displacement of the entire assembly is advantageously carried out jointly with the displacement of the microscope objective located at the housing, that is, a simultaneous displacement of the receiver located in the assembly. In an advantageous manner compared to known prior art solutions, the optical distance between the microscope objective and the detector 7 remains constant so that there are no longer any fluctuations in sensitivity caused by the adjustment of the optical conditions with respect to the focusing optics 7.

Without additional cable connections, which are also prone to electronic interference, the evaluation of the detector signal of the detector 7 is carried out in the housing 3 (by the arrangement of the electronics 12 shown in the drawing) and the digitized signal can travel from the electronics in direction of the microscope control without interference.

Due to the fact that the detector is arranged directly at the objective, the compact assembly shown in the drawing is arranged in an assembly or in the objective changer when an objective changer is suitably arranged below the housing 3, e.g., to change between two objectives by means of a push rod or turn rod as in DE 19822870A1.

In an advantageous manner and for the first time, the construction shown and described herein means that no additional lateral construction is provided as in the prior art which restricts the vision and action of the operator particularly when manipulators are provided between the objective and the specimen or when some other manipulation of the specimen is carried out.

Since the elements needed for the NDD detection are arranged close to the optical axis, the system is more stable as a whole and there are no longer asymmetrical, large mass distributions to be moved. A splitting of the specimen light by an additional beamsplitter after the mirror 5 into two or more beam portions leading to two or more detectors operated simultaneously or as needed can also be carried out (not shown) in the housing 2. This provides the possibility of great flexibility in spite of the compactness of the assembly.

A very high positioning accuracy between the objective and the detector is also ensured by the arrangement according to the invention.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

LIST OF REFERENCE NUMBERS

1 dovetail guide
2 locking knob
3 housing/carrier
4 swiveling mirror
5 deflecting mirror
6 focusing optics
7 detector PMT
8 transmission piece
9 cooling ribs
10 operator control with turn rod
11 objective insert with objective thread
12 receiver electronics
13 beam path

The invention claimed is:

1. A scanning microscope comprising:
   a light source, particularly a pulsed light source, which emits illumination light for illuminating a specimen;
   at least a first detector for detecting the detection light proceeding from the specimen;
   an objective through which the specimen can be illuminated and detected; and
   a second detector for non-descanned detection of the detection light proceeding from the specimen;
   wherein the objective is arranged in an illumination beam path and in a detection beam path;
   wherein an assembly is provided which comprises a housing which is attached to a microscope stand and which has at least one receptacle for a microscope objective for the illumination and/or detection beam path of the scanning microscope; and
   wherein at least the second detector is arranged in the housing and can be acted upon by specimen light.

2. The scanning microscope according to claim 1;
   wherein the assembly is vertically displaceable at the stand for focusing.

3. The scanning microscope according to claim 1;
   wherein the detection beam path of the microscope can be deflected in direction of the second detector by a swivelable mirror.

4. The scanning microscope according to claim 1;
   wherein a partially transparent mirror is provided in the detection beam path for simultaneous detection by the first detector and second detector.

5. The scanning microscope according to claim 1;
   wherein evaluating electronics for the signals of at least the second detector are arranged in the housing.

6. The scanning microscope according to claim 1;
   wherein at least the second detector is connected by heat-conducting media to cooling means, particularly cooling ribs, arranged outside the housing.

7. The scanning microscope according to claim 1;
wherein additional deflecting mirrors are provided in the housing for the detection light in direction of the second detector.

8. The scanning microscope according to claim 1;
wherein focusing optics are provided in the detection beam path for focusing the detection light on the second detector.

9. The scanning microscope according to claim 1;
wherein filters are provided in front of the detector for selecting detection wavelengths.

10. The scanning microscope according to claim 1;
wherein the NDD detection light is split, and at least another detector is arranged downstream of the split, preferably in the housing.

11. The scanning microscope according to claim 1, for nonlinear fluorescence excitation, in particular SHG and/or multiphoton excitation.

12. A compact assembly for non-descanned detection of specimen light for a scanning microscope, comprising:
a housing which is attached to a microscope stand and which has at least one receptacle for a microscope objective for the illumination and/or detection beam path of the scanning microscope; and
at least one detector which is arranged in the housing and which can be acted upon, particularly as needed, by specimen light.

13. The assembly according to claim 12;
wherein the assembly is vertically displaceable at the stand for focusing.

14. The assembly according to claim 12;
wherein the detection beam path of the microscope can be deflected in direction of the second detector by a swivelable mirror.

15. The assembly according to claim 12;
wherein a partially transparent mirror is provided in the detection beam path for simultaneous detection by the first detector and second detector.

16. The assembly according to claim 12;
wherein evaluating electronics for the signals of at least the second detector are arranged in the housing.

17. The assembly according to claim 12;
wherein at least the second detector is connected by heat-conducting media to cooling means, particularly cooling ribs, arranged outside the housing.

18. The assembly according to claim 12;
wherein additional deflecting mirrors are provided in the housing for the detection light in direction of the second detector.

19. The assembly according to claim 12;
wherein focusing optics are provided in the detection beam path for focusing the detection light on the second detector.

20. The assembly according to claim 12;
wherein filters are provided in front of the detector for selecting detection wavelengths.

21. The assembly according to claim 12;
wherein the NDD detection light is split, and at least another detector is arranged downstream of the split, preferably in the housing.

* * * * *

UNITED STATES PATENT AND TRADEMARK OFFICE
CERTIFICATE OF CORRECTION

| | |
|---|---|
| PATENT NO. | : 7,655,888 B2 |
| APPLICATION NO. | : 12/362110 |
| DATED | : January 29, 2009 |
| INVENTOR(S) | : Harald Schadwinkel, Hubert Wahl and Dieter Schau |

It is certified that error appears in the above-identified patent and that said Letters Patent is hereby corrected as shown below:

Title page, item [73] Assignee should read as follows: --Carl Zeiss MicroImaging GmbH--.

Signed and Sealed this

Fifteenth Day of June, 2010

David J. Kappos
*Director of the United States Patent and Trademark Office*